Nov. 27, 1956  H. A. WILSON  2,771,908
EXTENSION FOR EXHAUST PIPES
Filed March 19, 1954
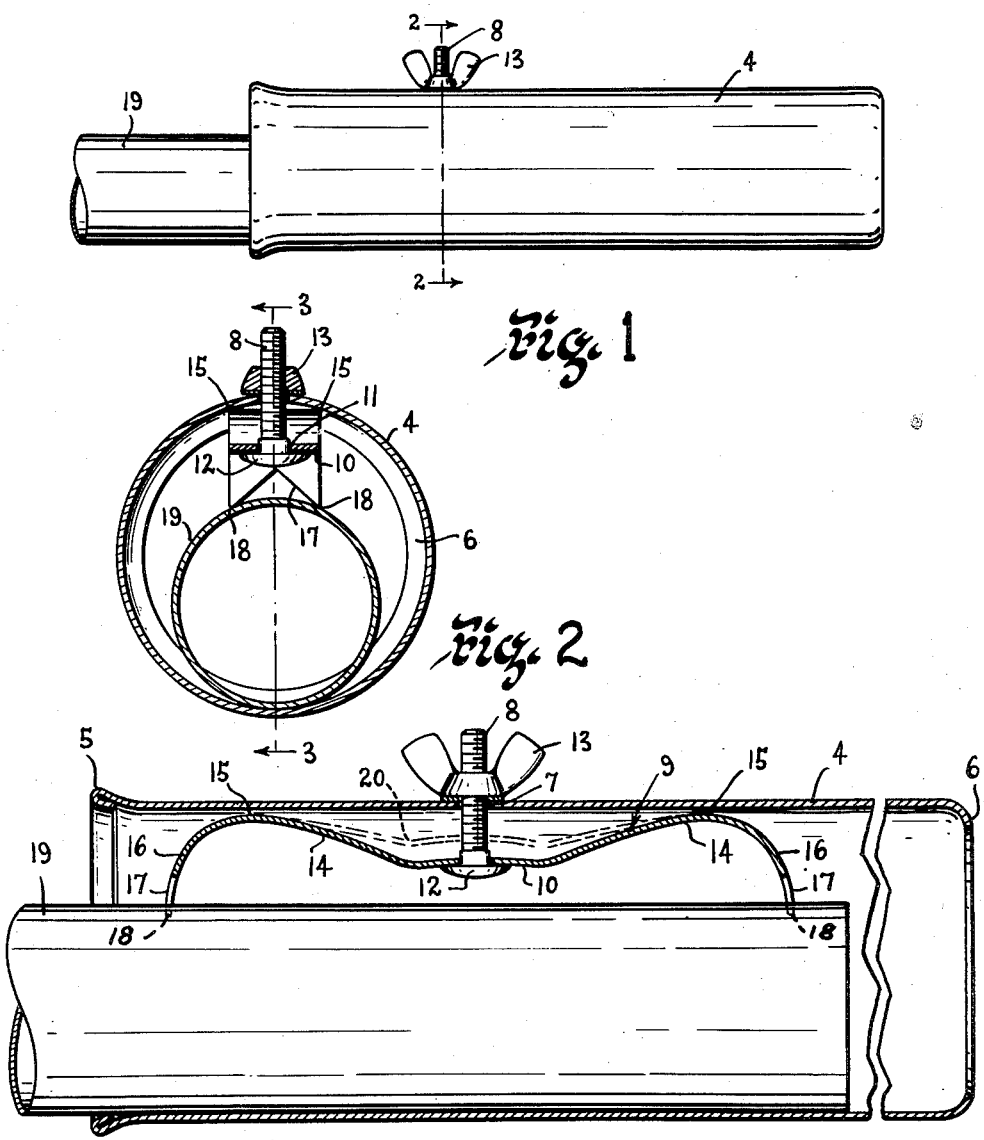
INVENTOR
HARRY A. WILSON
BY
*Louis L. Gagnon*
ATTORNEY

United States Patent Office 2,771,908
Patented Nov. 27, 1956

2,771,908

EXTENSION FOR EXHAUST PIPES

Harry A. Wilson, South Spencer, Mass., assignor to The A & W Machine Company, Charlton City, Mass., a corporation of Massachusetts Application March 19, 1954, Serial No. 417,295

3 Claims. (Cl. 138—46.5)

This invention relates to improvements in extensions for the exhaust pipes of motor vehicles and has particular reference to improved means for securing said extensions to said exhaust pipes and method of making the same.

One of the principal objects of the invention is to provide a novel, simple and efficient arrangement for attaching exhaust pipe extensions to the exhaust pipes of motor vehicles and method of making the same whereby the exhaust extensions will be resiliently held in positively clamped position of use on said exhaust pipes.

Another object is to provide a novel exhaust pipe extension which may be readily slid into desired position on the exhaust pipe and may thereafter be securely clamped in said position without in any way altering the initial characteristics of the exhaust pipe and with the extension being resiliently retained in position of use whereby it will be free to yield if accidentally struck and thereby prevent injury thereto or to the exhaust pipe.

Another object is to provide an exhaust extension of the above character which will be permanently and resiliently held against loosening after being secured in position of use.

Other objects and advantages of the invention and method of making the same will become apparent from the following description taken in connection with the accompanying drawing in which:

Fig. 1 is a side elevational view of the device embodying the invention;

Fig. 2 is an enlarged sectional view taken as on line 2—2 of Fig. 1 and looking in the direction indicated by the arrows; and Fig. 3 is a sectional view taken as on line 3—3 of Fig. 2 and looking in the direction indicated by the arrows.

Referring more particularly to the drawings wherein like characters of reference designate like parts throughout the several views, the device embodying the invention comprises a main tubularlike exhaust extension member 4 having an outwardly flared bead 5 on one end thereof and an inwardly turned lip 6 on the opposed end thereof. The said tubular member 4 is preferably formed of metal having an outer coating of nickel or chromium thereon. The said tubular member 4 is provided with an opening 7 in its side wall through which a bolt 8 is extended to secure an attachment member 9 internally thereof. The attachment member 9 is in the form of a relatively stiff blade spring having a central portion 10 disposed substantially parallel with the inner side wall of the tubular member 4 and having an opening 11 therein through which the shank of the bolt 8 is extended. The said bolt 8 is provided with an enlarged head 12 adapted to engage the inner side surface of said intermediate portion 10 and has a wing nut 13 thereon by means of which the intermediate portion 10 may be drawn outwardly toward the adjacent side wall of the tubular member 4 as shown by the dash lines 20. The said attachment member 9, on the opposed sides of its intermediate portion 10, has integral outwardly extending portions 14 adapted to engage the inner wall of the tubular member 4, as illustrated at 15. The said portions 14 thence curve inwardly, as illustrated at 16, and terminate in bifurcated ends 17 having pointed portions 18 adapted to engage the exhaust pipe 19 at spaced points on the opposed sides of the vertical center line of said exhaust pipe. The exhaust pipe 19 is of the conventional type.

After the tubular extension member 4 has been located in proper position of use on the exhaust pipe 19, as shown diagrammatically in Fig. 3, the wing nut 13 is tightened whereupon the intermediate portion 10 of attachment member 9 will be drawn outwardly by reason of the inherent resiliency of said intermediate portion 10 to a position closer to the adjacent inner side wall of the tubular extension member 4, as illustrated by the dash lines 20. This tightening of the wing nut 13 draws the intermediate portion 10 outwardly and by reason of the fact that the portions 14 engage with the inner surface of the tubular extension member 4, as illustrated at 15, the curved portions 16 will be urged inwardly and will cause pointed portions 18 of the bifurcated ends 17 to be forced into biting engagement with the exhaust pipe 19 and will resiliently retain said tubular extension member 4 in desired position of use.

The inherent resiliency of the attachment member 9, which is in the form of a resilient but rigid blade spring, will yieldingly retain the tubular extension member 4 in attached relation with the exhaust pipe 19 and will function as shock-absorbing means for preventing injury to the extension member and to the exhaust pipe should the said member be accidentally struck.

The tubular extension member and the attachment member therefore, are extremely simple in construction and may be readily mounted in position of use on the exhaust pipe without the requirement of any separate removable attachment means and without in any way having to alter the inherent characteristics of the exhaust pipe itself, that is, without requiring the forming of any drill holes or the like in the exhaust pipe as is required with some prior art methods of attaching tubular extension members on exhaust pipes.

It is particularly pointed out that the ends 17 of the attachment member 9 provide considerably spaced supporting points for the tubular extension member in the direction of the longitudinal axis of the exhaust pipe and thereby properly retain the extension from sagging and being permitted to occasionally engage the exhaust pipe and produce obnoxious noise during the use of the vehicle.

If it is desired to remove the extension all that is required is to loosen the wing nut an amount sufficient to release the gripping action of the pointed end portions 18 with the exhaust pipe whereby the said tubular extension member may be readily slid off of the exhaust pipe.

With the present arrangement there is no danger of loss of parts as the attachment member 9 and its associated parts are retained in constant assembled relation with the tubular extension member 4 when the said extension member is packaged and sold and when it is being placed in position of use.

From the foregoing description it will be seen that simple and economical means and method have been provided for accomplishing all of the objects and advantages of the invention. It will be apparent that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

Having described my invention, I claim:

1. A device of the character described comprising a tubular extension member formed preferably of metal having a single opening in a side wall thereof, an attachment member in the form of a blade spring having an intermediate portion spaced inwardly from the inner wall of the tubular member, integral portions extending outwardly of the opposed ends of said intermediate portion and angled to the side of said intermediate portion toward the inner wall of said extension member and continuing into integrally related convexly curved portions shaped to engage with said inner wall of the extension member at spaced points outwardly of said intermediate portion and thence turning inwardly and terminating in pointed end portions disposed in a direction substantially normal to the plane of said intermediate portion and extending inwardly beyond the plane of said intermediate portion on the side thereof opposed to said curved integral portions and being adapted to be fitted in engaged relation with the adjacent side wall of an exhaust pipe of a motor vehicle when said tubular extension member is placed thereon, said intermediate portion having an opening therein in susbtantial alignment with the opening in the side wall of the tubular extension member and a headed bolt extending outwardly through said aligned openings with its head engaging said intermediate portion and with its threaded end extending outwardly of the opening in the side wall of the tubular extension member and having a nut thereon which, when tightened, will draw said intermediate portion toward the inner adjacent wall of said extension member, simultaneously causing the curved integral portions to engage the inner wall of said tubular extension member with an effective rolling contact therewith which, in turn, causes said pointed ends, in response to said rolling contact, to resiliently bite into and secure the tubular extension member to the exhaust pipe.

2. A device of the character described comprising a tubular extension member formed preferably of metal having an opening in a side wall thereof, an attachment member in said tubular member and disposed in a direction longitudinally of said extension member, said attachment member having a relatively flat straight intermediate portion spaced from the inner wall of said tubular extension member and having an opening therein aligned with the opening in said extension member, a heated bolt extending outwardly through said openings and having a nut on the outer end thereof, said attachment member having integral portions extending outwardly of the opposed ends of said intermediate portion and angled toward the inner wall of said extension member and blending into curved portions which are so arched as to contact said inner wall of the extension member at spaced points and to further have inwardly disposed bifurcated end portions which are pointed and which face in a direction substantially normal to the plane of said intermediate portion, and being adapted to engage the side wall of an exhaust pipe of a motor vehicle at spaced points when the tubular extension member is placed thereon and the said nut is tightened on said bolt, said tightening of the nut being adapted to cause said intermediate portion to move toward the inner wall of the extension member and to simultaneously cause the spaced pointed ends of the bifurcated portions to move in response to the engagement of the spaced points of contact of said curved portions with the inner wall of the extension member as fulcrum points and to bite into the side wall of the exhaust pipe and resiliently grip and hold the extension member on said exhaust pipe.

3. A device of the character described comprising a tubular extension member formed preferably of metal having an opening in a side wall thereof, an attachment member in the form of a relatively rigid blade spring having an intermediate portion spaced inwardly of the inner wall of the tubular member, integral portions extending outwardly of the opposed ends of said intermediate portion and disposed to one side of the plane of said intermediate portion and toward the inner wall of said extension member and blending into convexly curved integral portions engaging the inner wall of the tubular member at spaced points outwardly disposed with respect to the ends of said intermediate portions and terminating in inwardly curving ends having spaced pointed portions adapted to engage the side wall of an exhaust pipe of a motor vehicle when the tubular extension member is placed thereon, with said exhaust pipe having its opposed side wall engaging the inner side wall of the tubular extension member on the side thereof opposed to said attachment member, said spaced pointed ends extending inwardly of the plane of said intermediate portion and having spaced straddling contact with the exhaust pipe with said intermediate portion being spaced between said side wall of the exhaust pipe and the inner wall of the extension member, said intermediate portion having an opening therein in susbtantial alignment with the opening in the extension member and a bolt extending through said aligned openings and having a nut thereon which, when tightened, will cause the intermediate portion to move toward the inner adjacent wall of said extension member and simultaneously cause the curved portions to exert a resilient pressure on said pointed ends to cause them to resiliently bite into and secure the tubular extension member to the exhaust pipe.

References Cited in the file of this patent

UNITED STATES PATENTS

| 1,837,346 | Thomas et al. | Dec. 22, 1931 |
| 2,102,802 | Lofgren | Dec. 21, 1937 |
| 2,260,712 | Harrison | Oct. 28, 1941 |
| 2,630,835 | Russell | Mar. 10, 1953 |